(12) United States Patent
Ozeki

(10) Patent No.: US 6,176,147 B1
(45) Date of Patent: Jan. 23, 2001

(54) POWER STEERING APPARATUS

(75) Inventor: Keita Ozeki, Ichinomiya (JP)

(73) Assignee: TRW Steering Systems Japan Co. Ltd., Aichi-ken (JP)

( * ) Notice: Under 35 U.S.C. 154(b), the term of this patent shall be extended for 0 days.

(21) Appl. No.: 09/304,740

(22) Filed: May 4, 1999

(30) Foreign Application Priority Data

May 7, 1998 (JP) .................................. 10-124743

(51) Int. Cl.$^7$ .................................. B62D 5/12; B62D 5/22
(52) U.S. Cl. .................. 74/388 PS; 74/422; 74/498; 74/606 R; 180/417; 180/428; 92/136; 92/163
(58) Field of Search .................. 74/388 PS, 422, 74/498, 606 R; 92/136, 163; 180/417, 428

(56) References Cited

U.S. PATENT DOCUMENTS

| 4,063,490 | * | 12/1977 | Duffy | 92/163 X |
| 4,123,965 | * | 11/1978 | Brown et al. | 92/136 |
| 4,418,781 | * | 12/1983 | Rabe et al. | 74/388 PS X |
| 5,285,864 | * | 2/1994 | Martin et al. | 180/417 |
| 5,730,244 | * | 3/1998 | Engler et al. | 180/417 |

FOREIGN PATENT DOCUMENTS

| 55-104577 | 7/1980 | (JP) . |
| 7-257408 | 10/1995 | (JP) . |
| 7-257409 | 10/1995 | (JP) . |
| 10-034281 | 2/1998 | (JP) . |

* cited by examiner

Primary Examiner—Allan D. Herrmann
(74) Attorney, Agent, or Firm—Tarolli, Sundheim, Covell, Tummino & Szabo L.L.P.

(57) ABSTRACT

In the power steering apparatus, a casing comprises integrated separate sections of a valve casing in which a control valve is incorporated, a cylinder tube of a power cylinder, and a gear casing in which a steering gear is incorporated. In the cylinder tube are formed a pair of supply/discharge passages, which are parallel to the axial direction of the cylinder tube, and through which hydraulic fluid flows into/from the power cylinder. In the gear casing are formed, by casting, a pair of pipes which communicate with a pair of supply/discharge passages. In the valve casing are formed a pair of supply/discharge ports which communicate with the pair of pipes.

3 Claims, 4 Drawing Sheets

POWER STEERING APPARATUS

FIELD OF THE INVENTION

The invention relates to a power steering apparatus which assists steering operation by controlling supply/discharge of hydraulic fluid into/from a power cylinder using a control valve working in accordance with the steering operation.

BACKGROUND OF THE INVENTION

In a conventional power steering apparatus for vehicles, a control valve and the operation chambers of the power cylinder are connected by means of external pipes. Accordingly, there is a problem that the power steering apparatus is not easy to mount on a vehicle. Another problem is that the external pipes are sometimes damaged by sprung stones and the like. Furthermore, such piping requires an additional assembly operation, thereby decreasing productivity of the apparatus.

To overcome these problems, power steering apparatuses, in which supply/discharge flow paths for connecting the control valve with the operation chambers of the power cylinder are formed by casting, have been proposed as described in Unexamined Japanese Utility Model Publication No.Sho55-104577, Unexamined Japanese Patent Publication No. Hei7-257408, Unexamined Japanese Patent Publication No. Hei7-257409, and Unexamined Japanese Patent Publication No. Hei10-34281.

However, the above proposed apparatuses have another problem that casting is not always easy because of complex configurations of the required supply/discharge flow paths. Further, when the casing consists of a plurality of parts to be formed by casting separately, the supply/discharge flow paths should be connected during the assembly operation after casting, and thus the required assembly time is increased.

SUMMARY OF THE INVENTION

Wherefore, an object of the invention is to provide a power steering apparatus which has relatively few external pipes and can be easily assembled.

To attain this and other objects, the present invention provides a power steering apparatus comprising a casing incorporating a control valve for working in accordance with a steering operation and a power cylinder into/from which hydraulic fluid is supplied/charged in accordance with the working of the control valve, wherein: the casing comprises integrated separate sections of a valve casing in which the control valve is incorporated, a cylinder tube of the power cylinder, and a gear casing in which a steering gear is incorporated; the cylinder tube is provided with a pair of supply/discharge passages which are parallel to the axial direction of the cylinder tube and through which hydraulic fluid flows into/from the power cylinder; the gear casing is provided with a pair of connection holes communicating with the pair of supply/discharge passages; and the valve casing is provided with a pair of supply/discharge ports communicating with the pair of connection holes.

The present invention also provides the above described power steering apparatus wherein: the cylinder tube and the gear casing have respective configurations and sizes such that when matingly assembled, the pair of supply/discharge passages communicate with the pair of connection holes; and the valve casing and the gear casing have respective configurations and sizes such that when matingly assembled, the pair of connection holes communicate with the pair of supply/discharge ports.

Further, there is provided a power steering apparatus comprising a casing incorporating a control valve for working in accordance with a steering operation and a power cylinder into/from which hydraulic fluid is supplied/charged in accordance with the working of said control valve, wherein: the casing comprises integrated separate sections of a body casing and a cylinder tube; the cylinder tube is provided with a pair of supply/discharge passages, which are parallel to the axial direction of the cylinder tube, and through which hydraulic fluid flows into/from the power cylinder; the body casing is provided with a pair of supply/discharge ports of the control valve which are open in the axial direction of the cylinder tube; and the supply/discharge passages and the supply/discharge ports are connected by means of pipes.

An advantage of the invention is that when the valve casing, the gear casing, and the cylinder tube are assembled to form the casing, the pair of supply/discharge ports, the connection holes, and the supply/discharge passages communicate with each other simultaneously and thus, assembly operation is relatively easy.

Another advantage is that no use of external pipes prevents damages thereof by sprung stones and the like.

On the other hand, the minimum use of external pipes leads to still another advantage that the formation of the gear casing is relatively easy. A further advantage is that when the gear casing and the cylinder tube are assembled to form the casing, the pair of supply/discharge ports, the pipes, and the supply/discharge passages communicate with each other simultaneously and thus, assembly operation is relatively easy.

BRIEF DESCRIPTION OF THE DRAWINGS

The invention will now be described, by way of example, with reference to the accompanying drawings, in which.

DETAILED DESCRIPTION OF THE PREFERRED EMBODIMENT

Figure 1:
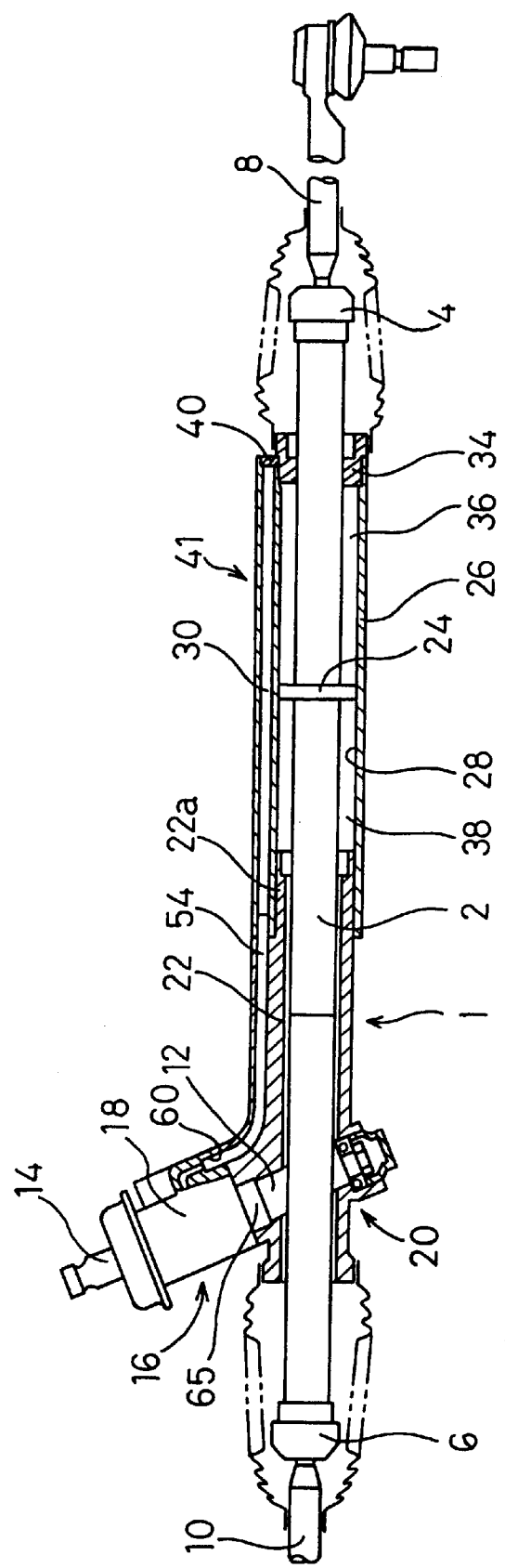
FIG. 1 is a longitudinal sectional view of a first preferred embodiment of a power steering apparatus according to the present invention.

As shown in FIG. 1, a rack bar 2 is axially slidably held in a casing 1. Tie Rods 8 and 10 are connected to both ends of the rack bar 2 through adjustable joints 4 and 6, respectively.

Also, in the casing 1, a pinion shaft 12 having a pinion which engages with racks formed on the rack bar 2 is rotatably held so as to cross the rack bar 2. For the purpose of simplification, the racks of the rack bar 2 and the pinion of the pinion shaft 12 are not shown in FIG. 1. An input shaft 14 rotationally driven by the operation of a not shown steering wheel is disposed in the coaxial direction of the pinion shaft 12. A control valve 16 which changes the supply direction of hydraulic fluid provided from a not shown hydraulic fluid source is arranged in the casing 1.

The casing 1 includes three parts, namely, a valve casing 18 incorporating the control valve 16, a gear casing 22 incorporating a steering gear 20 comprising not shown racks and a pinion, and a cylinder tube 26, into which a piston 24 integrated with the rack bar 2 is slidably inserted.

Figure 2:
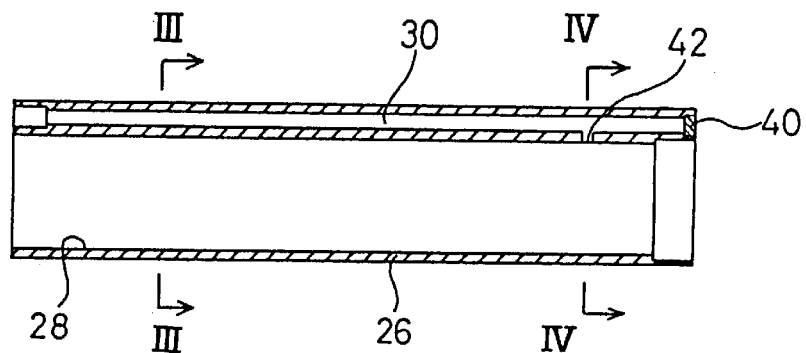
FIG. 2 is an enlarged longitudinal sectional view of the cylinder tube of the embodiment.
Figure 3:
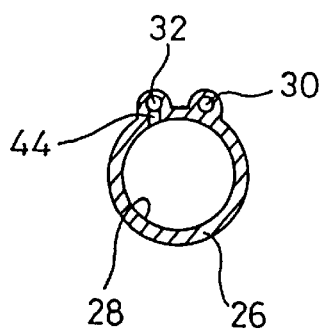
FIG. 3 is a cross sectional view taken along the line III—III of FIG. 2.
Figure 4:
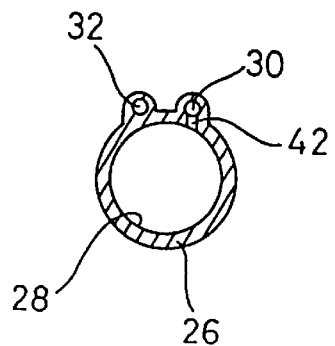
FIG. 4 is a cross sectional view taken along the line IV—IV of FIG. 2.

In the cylinder tube 26, as shown in FIGS. 2 to 4, a sliding space 28, in which the piston 24 is slidably inserted, is formed so as to axially penetrate the cylinder tube 26. Also, a pair of supply/discharge passages 30 and 32 are formed parallel to the axial direction of the cylinder tube 26 so as to penetrate the cylinder tube 26.

A plug member 34 is fitted in at one end of the sliding space 28, and the rack bar 2 penetrates the plug member 34 to protrude to the outside. A mating part 22a of the gear casing 22 is inserted into the other end of the sliding space 28, and thus operation chambers 36 and 38 enclosed by the cylinder tube 26, the plug member 34, and the gear casing 22 are formed on both sides of a piston 24. A power cylinder 41 includes the gear casing 22, the cylinder tube 26, the plug member 34, the piston 24 and the rack bar 2. Each one end of the pair of supply/discharge passages 30 and 32 is plugged up by an inserted plug 40 (only one of them is shown in FIG. 2). The pair of supply/discharge passages 30 and 32 communicate with the pair of operation chambers 36 and 38 through communicating holes 42 and 44, respectively.

Figure 5:
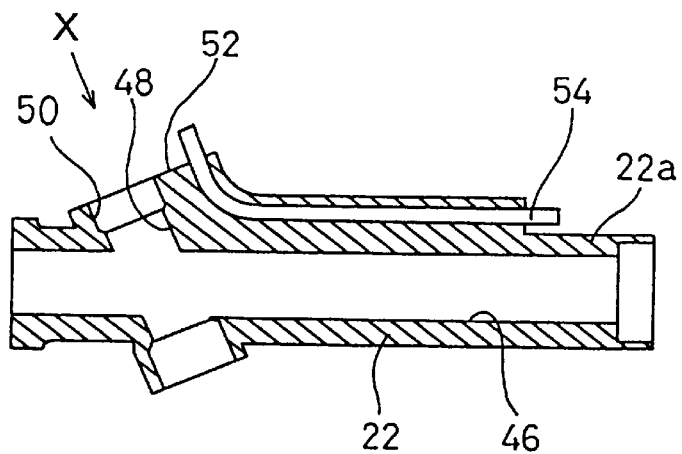
FIG. 5 is an enlarged longitudinal sectional view of the gear casing of the embodiment.
Figure 6:
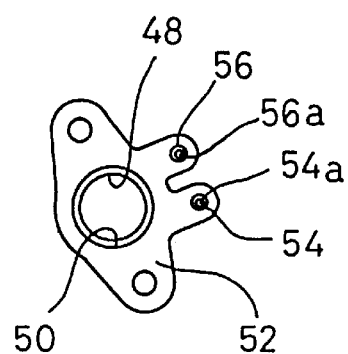
FIG. 6. is a view taken in the direction of the arrow X in FIG. 5.

As shown in FIG. 5, in the gear casing 22, an insertion space 46 into which the rack bar 2 is penetratingly inserted is formed as well as a reception space 48 into which the pinion shaft 12 is inserted. In the coaxial direction of the reception space 48 is formed a guide hole 50, which is open on a first attaching surface 52 perpendicular to the direction in which the reception space 48 extends.

In the gear casing 22, a pair of pipes 54 and 56 having connection holes 54a and 56a, respectively, are incorporated integratedly by casting, and the distance between the pair of pipes 54 and 56 is the same as that between the pair of supply/discharge passages 30 and 32. Each one end of the pair of pipes 54 and 56 projects from the gear casing 22 such that the above each one end of the pipes 54 and 56 is inserted into each of the pair of supply/discharge passages 30 and 32 when the gear casing 22 is inserted into the sliding space 28.

Figure 7:
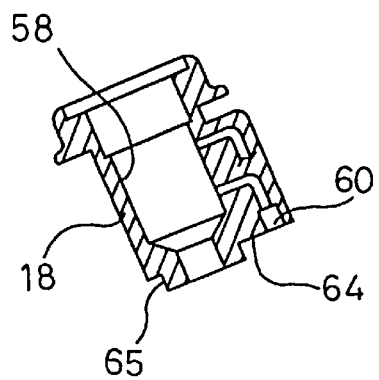
FIG. 7 is an enlarged longitudinal view of the valve casing of the embodiment.

Each of the other end of the pair of pipes 54 and 56 projects from the first attaching surface 52 perpendicularly. In the valve casing 18, as shown in FIG. 7, is formed an insertion space 58 into which the input shaft 14 is inserted. Also, a pair of supply/discharge ports 60 (only one of them is shown) of the control valve 16 are open on a second attaching surface 64.

The pair of supply/discharge ports 60 are formed perpendicularly to the second attaching surface 64, and the distance between the ports 60 is the same as that between the pair of pipes 54 and 56. The valve casing 18 is provided with an engaging part 65, which engages with the guide hole 50 when the valve casing 18 is attached to the gear casing 22.

When the engaging part 65 is inserted into the guide hole 50, and the second attaching surface 64 of the valve casing 18 and the first attaching surface 52 of the gear casing 22 closely contact with each other, the other ends of the pair of pipes 54 and 56 are inserted into the pair of supply/discharge ports 60, respectively.

The assembly process and the action of the power steering apparatus of the aforementioned embodiment will now be described.

When the mating part 22a of the gear casing 22 is inserted into the cylinder tube 26, the pair of pipes 54 and 56 are inserted simultaneously into the pair of supply/discharge passages 30 and 32, respectively. Then, when the engaging part 65 of the valve casing 18 is inserted into the guide hole 50 of the gear casing 22 so as to make the first and second attaching surfaces 52 and 64 closely contact with each other, the pipes 54 and 56 are inserted simultaneously into the pair of supply/discharge ports 60.

Once the power steering apparatus is assembled as shown in FIG. 1 and mounted on a vehicle, the input shaft 14 is rotated in response to the steering operation and therefore, the control valve 16 is changed over. As a result, supply/discharge of hydraulic fluid into/from the both operation chambers 36 and 38 is performed through the pair of supply/discharge ports 60, the pipes 54 and 56, and the supply/discharge passages 30 and 32. Consequently, because of the action on the piston 24 caused by the introduced pressurized hydraulic fluid, a driving force in accordance with the direction of the steering operation is exerted on the rack bar 2.

As described hereinbefore, when the valve casing 18, the gear casing 22, and the cylinder tube 26 are assembled to form the casing 1, the pair of supply/discharge ports 60, the connection holes 54a and 56a, and the supply/discharge passages 30 and 32 communicate with each other simultaneously and thus, assembly operation is relatively easy. Also, no use of external pipes prevents damages thereof by sprung stones and the like.

Figure 8:
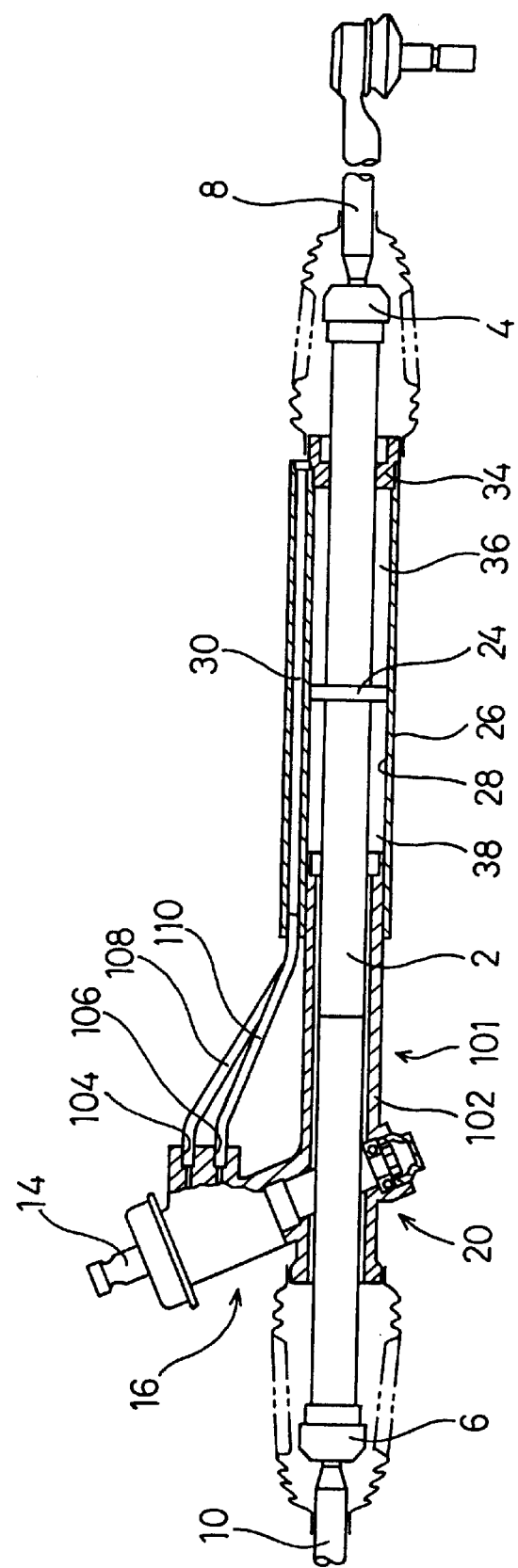
FIG. 8 is a longitudinal sectional view of a second preferred embodiment of a power steering apparatus according to the present invention.

A second embodiment of a power steering apparatus having some difference from the first embodiment will now be described with reference to FIG. 8. The same members as those mentioned in the first embodiment are applied the same reference numerals and detailed explanation thereof is omitted.

In the second embodiment of the power steering apparatus, the casing 101 includes two parts, namely, a gear casing 102 and a cylinder tube 26, and the control valve 16 is incorporated in the gear casing 102. Supply/discharge ports 104 and 106 of the control valve 16 are formed in the gear casing 102 such that the supply/discharge ports 104 and 106 are open to the opening of the supply/discharge passages 30 and 32 of the cylinder tube 26 and parallel to the supply/discharge passages 30 and 32. A pair of pipes 108 and 110, which are previously bent into required shapes, are inserted at one end thereof into the supply/discharge passages 30 and 32, and at the other end thereof into the supply/discharge ports 104 and 106,respectively.

When the gear casing 102 is inserted into the cylinder tube 26, the pair of pipes 108 and 110, which have been inserted into the supply/discharge ports 104 and 106 at one end, are inserted simultaneously into the supply/discharge passages 30 and 32 at the other end. Thus, assembly of the casing 101 is completed.

In the second embodiment, the use of external pipes 108 and 110 enables omission of casting procedure of the pipes 108 and 110, thereby making the formation of the gear casing 102 relatively easy. Further, when the gear casing 102 and the cylinder tube 26 are assembled to form the casing 101, the pair of supply/discharge ports 104 and 106, the pipes 108 and 110, and the supply/discharge passages 30 and 32 communicate with each other simultaneously and thus, assembly operation is relatively easy.

The invention is not restricted to the above described embodiments and may be embodied in various forms without departing from the spirit and the scope of the invention.

What is claimed is:

1. A power steering apparatus comprising a casing incorporating a control valve which works in accordance with a steering operation and a power cylinder into/from which hydraulic fluid is supplied/discharged in accordance with the working of said control valve, wherein:

said casing comprises integrated separate sections of a valve casing in which said control valve is incorporated, a cylinder tube of said power cylinder, and a gear casing in which a steering gear is incorporated;

said cylinder tube is provided with a pair of supply/discharge passages which are parallel to the axial direction of said cylinder tube, and through which hydraulic fluid flows into/from said power cylinder;

said gear casing is provided with a pair of connection holes communicating with said pair of supply/discharge passages; and said valve casing is provided with a pair of supply/discharge ports communicating with said pair of connection holes.

2. A power steering apparatus according to claim 1, wherein:

said cylinder tube and said gear casing have respective configurations and sizes such that when matingly assembled, said pair of supply/discharge passages communicate with said pair of connection holes; and said valve casing and said gear casing have respective configurations and sizes such that when matingly assembled, said pair of connection holes communicate with said pair of supply/discharge ports.

3. A power steering apparatus comprising a casing incorporating a control valve which works in accordance with a steering operation and a power cylinder into/from which hydraulic fluid is supplied/discharged in accordance with the working of said control valve, wherein:

said casing comprises integrated separate sections of a body casing and a cylinder tube;

said cylinder tube is provided with a pair of supply/discharge passages which are parallel to the axial direction of said cylinder tube and through which hydraulic fluid flows into/from said power cylinder;

said body casing is provided with a pair of supply/discharge ports of said control valve which are open in the axial direction of said cylinder tube; and said supply/discharge passages and said supply/discharge ports are connected by means of pipes.

* * * * *